United States Patent
Kitashou

(10) Patent No.: US 8,830,344 B2
(45) Date of Patent: Sep. 9, 2014

(54) DISTORTION CORRECTION PROCESSING APPARATUS, DISTORTION CORRECTION PROCESSING METHOD AND STORAGE MEDIUM

(75) Inventor: Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 13/459,395

(22) Filed: Apr. 30, 2012

(65) Prior Publication Data

US 2012/0287298 A1   Nov. 15, 2012

(30) Foreign Application Priority Data

May 11, 2011  (JP) .................................. 2011-106619

(51) Int. Cl.
*H04N 5/225* (2006.01)
*H04N 9/31* (2006.01)
*H04N 5/357* (2011.01)

(52) U.S. Cl.
CPC ............ *H04N 9/3185* (2013.01); *H04N 5/3572* (2013.01)
USPC ...................................................... 348/222.1

(58) Field of Classification Search
USPC ................................. 382/279, 289
See application file for complete search history.

(56) References Cited

U.S. PATENT DOCUMENTS

| | | | |
|---|---|---|---|
| 8,396,322 B1 * | 3/2013 | Woodall et al. | ............... 382/275 |
| 2009/0040374 A1 | 2/2009 | Kobayashi | |
| 2012/0062588 A1 * | 3/2012 | Sato | .............................. 345/611 |

FOREIGN PATENT DOCUMENTS

JP    2009-044460 A    2/2009

* cited by examiner

*Primary Examiner* — Gary C Vieaux
(74) *Attorney, Agent, or Firm* — Fitzpatrick, Cella, Harper & Scinto

(57) ABSTRACT

There is provided with an image processing apparatus which performs transformation processing for an input image, and performs filter processing for a transformed image including the transformed input image in an image area, thereby generating an output image, comprising a determination unit configured to determine whether a pixel position to be mapped to a pixel of interest position in the transformed image by a transformation processing is present among pixel positions in the input image; and a calculation unit configured to set a pixel value, obtained by a convolution operation between filter coefficients and pixel values of pixels near a processing pixel position in the transformed image, as the pixel value of the pixel at the processing pixel position in the output image if the pixel position to be mapped is present.

5 Claims, 12 Drawing Sheets

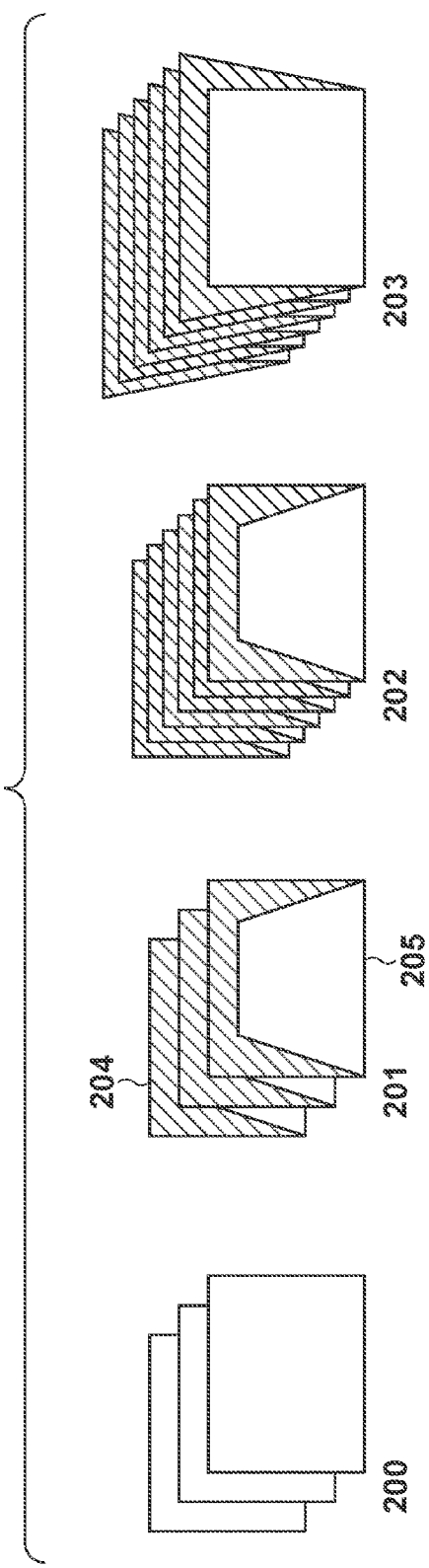

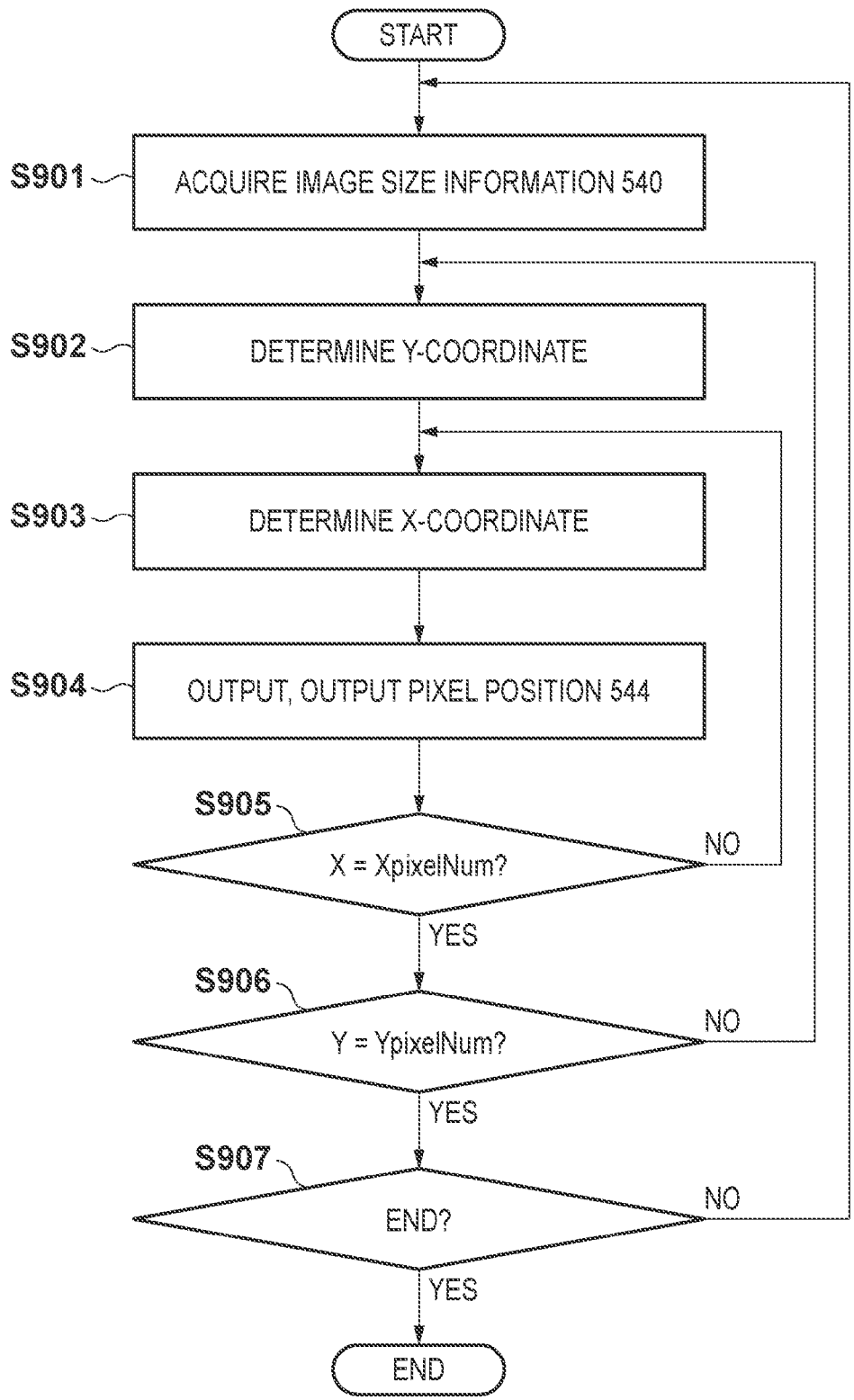

DISTORTION CORRECTION PROCESSING APPARATUS, DISTORTION CORRECTION PROCESSING METHOD AND STORAGE MEDIUM

BACKGROUND OF THE INVENTION

1. Field of the Invention

The present invention relates to an image processing technique.

2. Description of the Related Art

Conventionally, techniques for transforming images and techniques for performing filter processing for images are independently known. As an example of the image transformation techniques, techniques (to be collectively referred to as distortion correction processing hereinafter) called, for example, distortion correction processing, keystone correction processing, or geometric correction processing are available. A distortion correction technique is employed in, for example, a projector. FIGS. 1A to 1D show how a projector 100 displays images on a screen 101. When the angle that the screen 101 makes with the optical axis of a projection optical system of the projector 100 is 90°, a projected image 102 is displayed on the screen 101 in a normal shape (for example, a rectangle). On the other hand, if this angle is not 90°, a projected image 103 is displayed on the screen 101 in a distorted shape (for example, a trapezoid). To correct this distortion, distortion correction processing is performed. FIG. 2 illustrates an example of the distortion correction processing. An input image 200 is converted into a distortion-corrected image 201 by the distortion correction processing. Note that the distortion-corrected image 201 includes a trapezoidal effective area 205 and a blanking area 204 other than the effective area 205. When the distortion-corrected image 201 is projected onto the screen 101, the effective area 205 is displayed on the screen 101 in a rectangle (image 203).

Various techniques of performing filter processing for images are known as well. As an example of the filter processing, visibility improvement processing which uses spatial filter processing is available. This visibility improvement processing includes improving the frame rate when a moving image is displayed (see, for example, an image 202 shown in FIG. 2). As an example of such processing, a technique described in Japanese Patent Laid-Open No. 2009-44460 is available.

The inventor of the present invention examined the use of distortion correction processing and filter processing in combination, and found that the following problems are posed in that case. The first problem will be described first with reference to FIG. 3A. Referring to FIG. 3A, a projected image 304 projected on the screen is obtained by performing filter processing for a distortion-corrected image 303, and projecting the processed image onto the screen. An area 301 in the distortion-corrected image 303 corresponds to an area 305 in the projected image 304. Also, an area 302 in the distortion-corrected image 303 corresponds to an area 306 in the projected image 304. Note that the areas 301 and 302 have the same size, while the areas 305 and 306 have different sizes. That is, when filter processing is performed for the distortion-corrected image 303 using the area 301 as a reference area, the projected image 304 appears to the observer as if it were obtained by performing filter processing for the distortion-corrected image 303 using the area 305 as a reference area. Similarly, when filter processing is performed for the distortion-corrected image 303 using the area 302 as a reference area, the projected image 304 appears to the observer as if it were obtained by performing filter processing using the area 306 as a reference area. In this manner, the projected image 304 appears to the observer as if it were obtained by nonuniform filter processing, and the observer may recognize this appearance as degradation in image quality. When, for example, smoothing is performed by filter processing, the image sharpness lowers more considerably in the area 305 than in the area 306.

The second problem will be described next with reference to FIG. 3B. When filter processing is performed for the distortion-corrected image 303 in reference to an area 300 at the boundary between a blanking area 307 and an effective area 308, the sharpness in the vicinity of this boundary may decrease. The pixels in the blanking area 307 normally have, for example, predetermined pixel values (R, G, B)=(0, 0, 0) (black). The central pixel of an area 310 falls within the blanking area 307, and its pixel values are obtained by filter processing in reference to the area 310. However, because the area 310 partially includes the effective area 308, the pixel values obtained by filter processing are different from the above-mentioned predetermined pixel values.

On the other hand, the central pixel of an area 309 falls within the effective area 308, and its pixel values are obtained by filter processing in reference to the area 309. However, because the area 309 includes the blanking area 307, the pixel values obtained by filter processing are influenced by those in the blanking area 307. That is, as described above, if the pixel in the blanking area 307 is black, the pixel values in the blanking area 307 are relatively large and those in the effective area 308 are relatively small at the boundary between the blanking area 307 and the effective area 308.

SUMMARY OF THE INVENTION

The present invention enables to prevent degradation in image quality when image transformation processing and filter processing are continuously performed.

According to one aspect of the invention, there is provided an image processing apparatus which performs transformation processing for an input image, and performs filter processing for a transformed image including the transformed input image in an image area, thereby generating an output image, comprising: an acquisition unit configured to acquire the input image; a determination unit configured to determine whether a pixel position to be mapped to a pixel of interest position in the transformed image by the transformation processing is present among pixel positions in the input image; a transformation unit configured to set a pixel value at the pixel position in the input image, to be mapped to the pixel of interest position in the transformed image, as a pixel value of a pixel at the pixel of interest position in the transformed image if the determination unit determines that the pixel position to be mapped is present, and set a predetermined value as the pixel value of the pixel at the pixel of interest position if the determination unit determines that the pixel position to be mapped is absent; a calculation unit configured to calculate a pixel value of a pixel at a processing pixel position in the output image from the transformed image obtained by setting a pixel value for each pixel position which forms the transformed image by the transformation unit, wherein the calculation unit is further configured to: set a pixel value, obtained by a convolution operation between filter coefficients and pixel values of pixels near the processing pixel position in the transformed image, as the pixel value of the pixel at the processing pixel position in the output image if the determination unit determines that the pixel position to be mapped is present, and set one of a predetermined pixel value and the pixel value of the pixel at the processing pixel position in the transformed image as the pixel value of the pixel at the processing pixel position in the output image if the determination unit determines that the pixel position to be mapped is absent; and an output unit configured to output the output image obtained by setting a pixel value for each pixel position in the output image by the calculation unit.

According to another aspect of the invention, there is provided an image processing method of performing transformation processing for an input image, and performing filter processing for a transformed image including the transformed input image in an image area, thereby generating an output image, comprising the steps of: acquiring the input image; determining whether a pixel position to be mapped to a pixel of interest position in the transformed image by the transformation processing is present among pixel positions in the input image; setting a pixel value at the pixel position in the input image, to be mapped to the pixel of interest position in the transformed image, as a pixel value of a pixel at the pixel of interest position in the transformed image if the pixel position to be mapped is determined to be present, and setting a predetermined value as the pixel value of the pixel at the pixel of interest position if the pixel position to be mapped is determined to be absent; calculating a pixel value of a pixel at a processing pixel position in the output image from the transformed image obtained by setting a pixel value for each pixel position which forms the transformed image in the setting step, comprising: setting a pixel value, obtained by a convolution operation between filter coefficients and pixel values of pixels near the processing pixel position in the transformed image, as the pixel value of the pixel at the processing pixel position in the output image if the pixel position to be mapped is determined to be present, and setting one of a predetermined pixel value and the pixel value of the pixel at the processing pixel position in the transformed image as the pixel value of the pixel at the processing pixel position in the output image if the pixel position to be mapped is determined to be absent; and outputting the output image obtained by setting a pixel value for each pixel position in the output image in the calculation step.

According to the invention, degradation in image quality when image transformation processing and filter processing are continuously performed can be prevented.

Further features of the present invention will become apparent from the following description of exemplary embodiments with reference to the attached drawings.

BRIEF DESCRIPTION OF THE DRAWINGS

FIG. 2 is an explanatory view for illustrating distortion correction processing;

FIG. 9 is a flowchart illustrating an example of processing performed by a counter 506;

DESCRIPTION OF THE EMBODIMENTS

Preferred embodiments of the present invention will be described in detail below with reference to the accompanying drawings. Note that configurations shown in the following embodiments provide merely examples, and the present invention is not limited to these configurations.

[First Embodiment]

Figure 5:
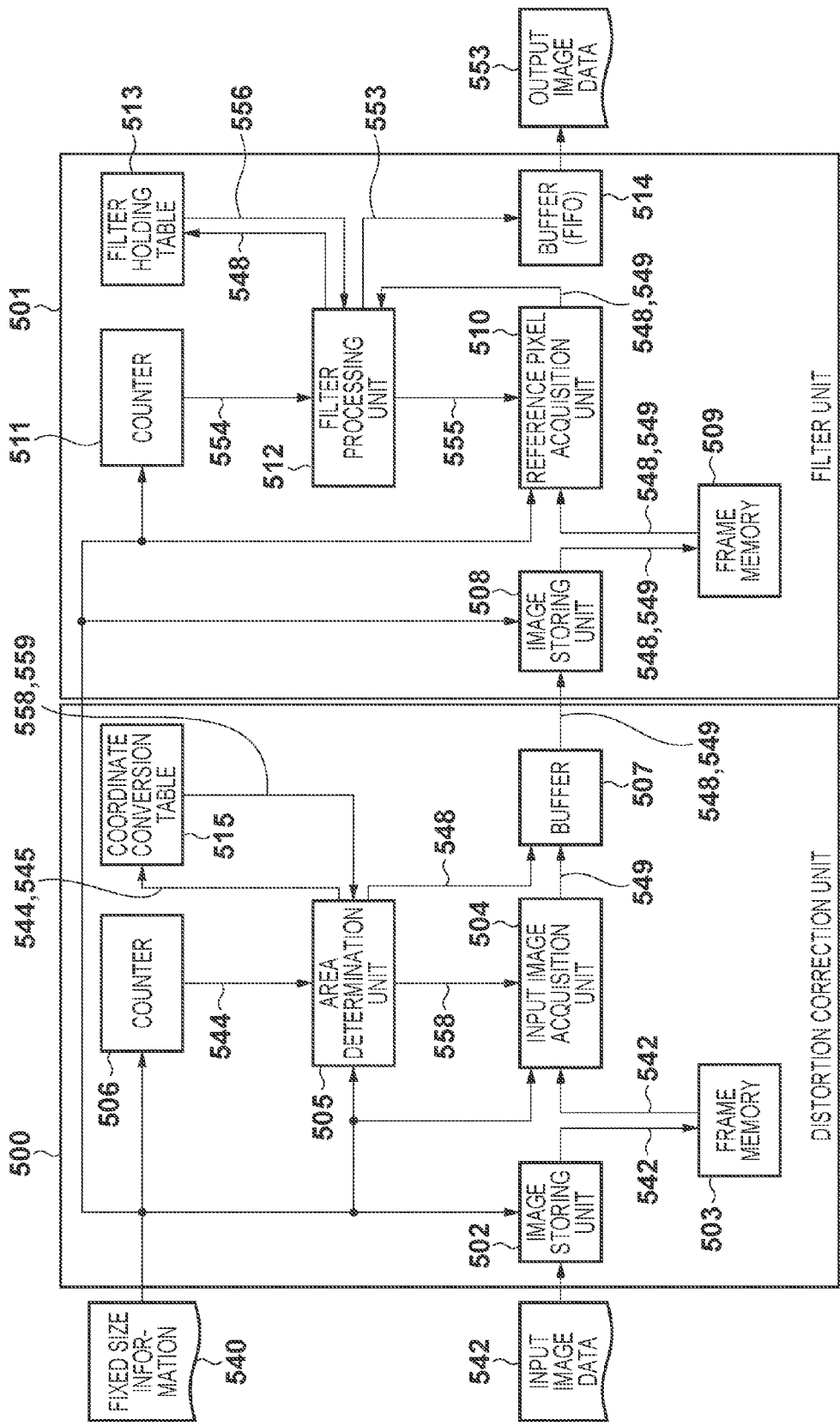
FIG. 5 is a block diagram illustrating an example of the functional configuration of an image processing apparatus according to the first embodiment.

FIG. 5 illustrates an example of the functional configuration of an image processing apparatus according to the first embodiment. Each unit provided in the image processing apparatus according to this embodiment will be described in detail below with reference to FIG. 5. The image processing apparatus according to this embodiment includes a distortion correction unit 500 and filter unit 501, as shown in FIG. 5.

The distortion correction unit 500 will be described first. In this embodiment, the distortion correction unit 500 performs transformation processing (distortion correction processing) for an input image. The distortion correction unit 500 outputs a distortion-corrected image (transformed image) including an image having undergone distortion correction in an image area. However, the processing performed by the distortion correction unit 500 is not limited to distortion correction processing, and the distortion correction unit 500 can perform arbitrary image transformation processing. Image transformation performed by the distortion correction unit 500 may be, for example, horizontal/vertical correction, lens distortion correction, geometric transformation, or omnidirectional image transformation. The omnidirectional image transformation means transformation processing in which a 360-degree image acquired by an optical system such as a fisheye lens is developed into a rectangular image.

The distortion correction unit 500 includes an image storing unit 502, an input image acquisition unit 504, an area determination unit 505, and a counter 506 as processing units. The distortion correction unit 500 also includes a frame memory 503, a buffer 507, and a coordinate conversion table 515 as storage units. The frame memory 503 and the buffer 507 can be implemented by, for example, a RAM 400 (to be described later). Also, the coordinate conversion table 515 can be implemented by a ROM 401 (to be described later). In this embodiment, the buffer 507 operates as a FIFO buffer.

Figure 7:
FIG. 7 is a view illustrating an example of the data structure of input image data 542.
Figure 8A:
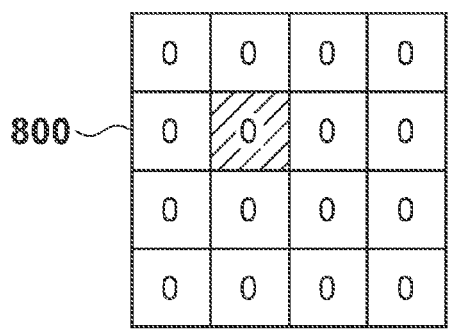
FIGS. 8A to 8D are views illustrating examples of the correspondence between filter selection information 548 and a filter 556.
Figure 8B:
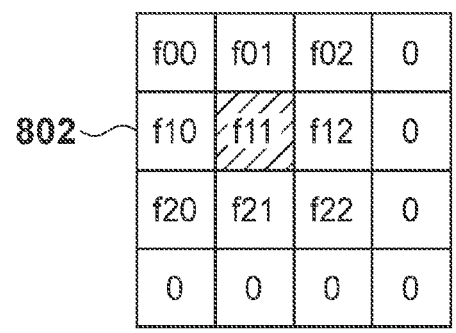
Figure 8C:
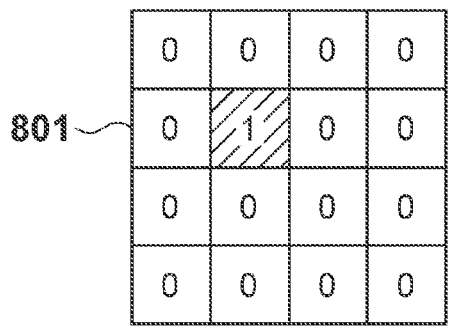
Figure 8D:
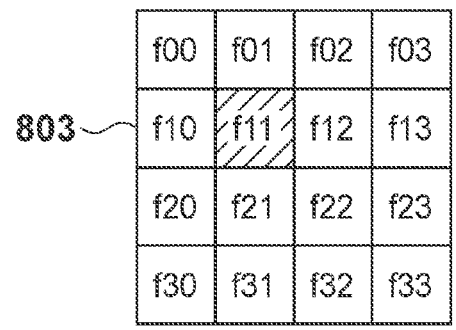

An input image and image size information 540 are input to the distortion correction unit 500. A moving image may be input to the distortion correction unit 500, and a plurality of input images (frame images) are input to the distortion correction unit 500 in this case. The input image is formed by a plurality of pixels. More specifically, data associated with each pixel in the input image is input to the distortion correction unit 500. Data associated with each pixel in the input image will be referred to as input image data 542 hereinafter. FIG. 7 illustrates an example of the data structure of the input image data 542. The input image data 542 includes Vsync and Hsync flags and R, G, and B components, as shown in FIG. 7.

The Vsync flag is a vertical synchronization signal. Among input image data 542 which form one frame image, the one input first has a Vsync flag of 1. Also, the other input image data 542 have a Vsync flag of 0. Normally, the input image data 542 input first indicates information associated with the start pixel of each frame image.

The Hsync flag is a horizontal synchronization signal. Among input image data 542 which form one line in each frame image, the one input first has an Hsync flag of 1. Also, the other input image data 542 have an Hsync flag of 0. Normally, the input image data 542 input first indicates information associated with the start pixel of each line.

The R, G, and B components indicate the R, G, and B pixel values, respectively, of each pixel. Nevertheless, the structure of the input image data 542 according to this embodiment is not limited to that shown in FIG. 7. The input image data 542 may have, for example, pixel values based on a color space different from an RGB color space. Also, the input image data 542 need not always have Hsync and Vsync flags, and may have, for example, coordinate information.

The image size information 540 indicates the size of an input image. The image size information 540 may include, for example, XPixelNum indicating the number of pixels in the X-direction, and YPixelNum indicating the number of pixels in the Y-direction.

Figure 13:
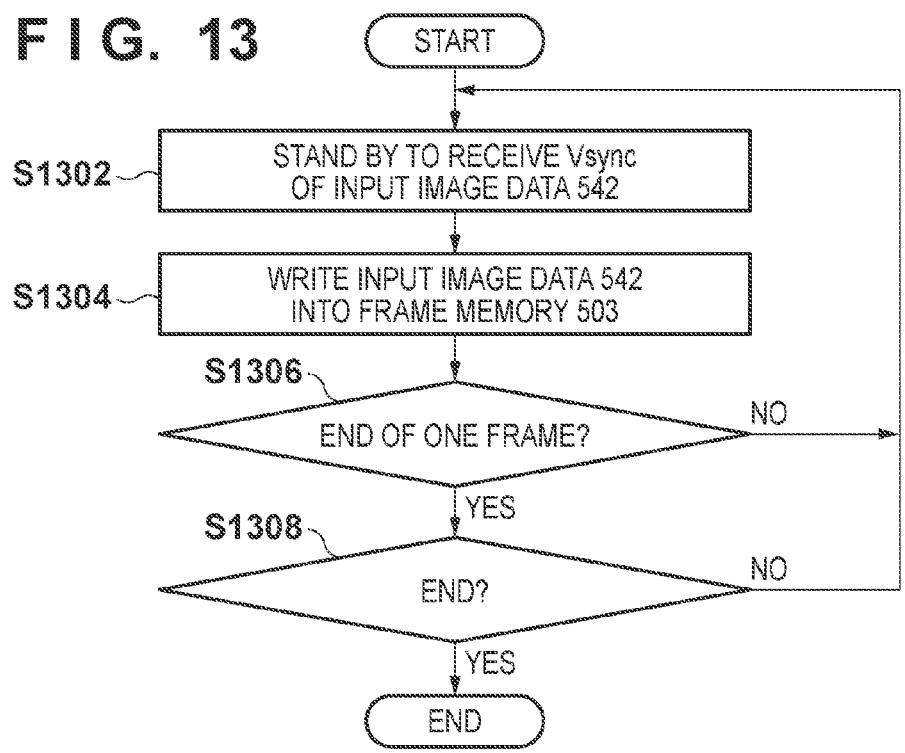
FIG. 13 is a flowchart illustrating an example of processing performed by an image storing unit 502.

The image storing unit 502 acquires the input image data 542 and image size information 540 (input unit). The image storing unit 502 writes the input image data 542 into the frame memory 503. Processing performed by the image storing unit 502 will be described herein with reference to a flowchart shown in FIG. 13.

In step S1302, the image storing unit 502 stands by to receive a new frame image. For example, the image storing unit 502 acquires input image data 542 and determines whether the Vsync flag of the input image data 542 is 0 or 1. If the Vsync flag is 1, the process advances to step S1304. If the Vsync flag is 0, the image storing unit 502 repeats acquisition of input image data 542 and determination of the Vsync flag until it acquires input image data 542 having a Vsync flag of 1.

In step S1304, the image storing unit 502 writes the acquired input image data 542 into the frame memory 503. More specifically, the image storing unit 502 writes the input image data 542 at a designated address in the frame memory 503. The image storing unit 502 can calculate this designated address in accordance with the image size information 540. More specifically, the image storing unit 502 counts the number of input image data 542 input after input image data 542 having a Vsync flag of 1. The image storing unit 502 can calculate a corresponding address in the frame memory 503 in accordance with the input image size and count.

In step S1306, the image storing unit 502 determines whether input image data 542 of one frame have been processed. The image storing unit 502 can perform this determination in accordance with, for example, the above-mentioned count and the input image size indicated by the image size information 540. In another embodiment, the image storing unit 502 may determine whether input image data 542 of one frame have been processed, in accordance with their Vsync flags. If input image data 542 of one frame have not yet been processed, the process returns to step S1302. If input image data 542 of one frame have been processed, the process advances to step S1308.

In step S1308, the image storing unit 502 determines whether the image input processing is to end. This determination may be performed in accordance with, for example, a user instruction or a control signal input to the distortion correction unit 500 (for example, the image storing unit 502), together with the input image data 542. If the image input processing is not to end, the process returns to step S1302. If the image input processing is to end, the process shown in FIG. 13 ends.

Figure 6:
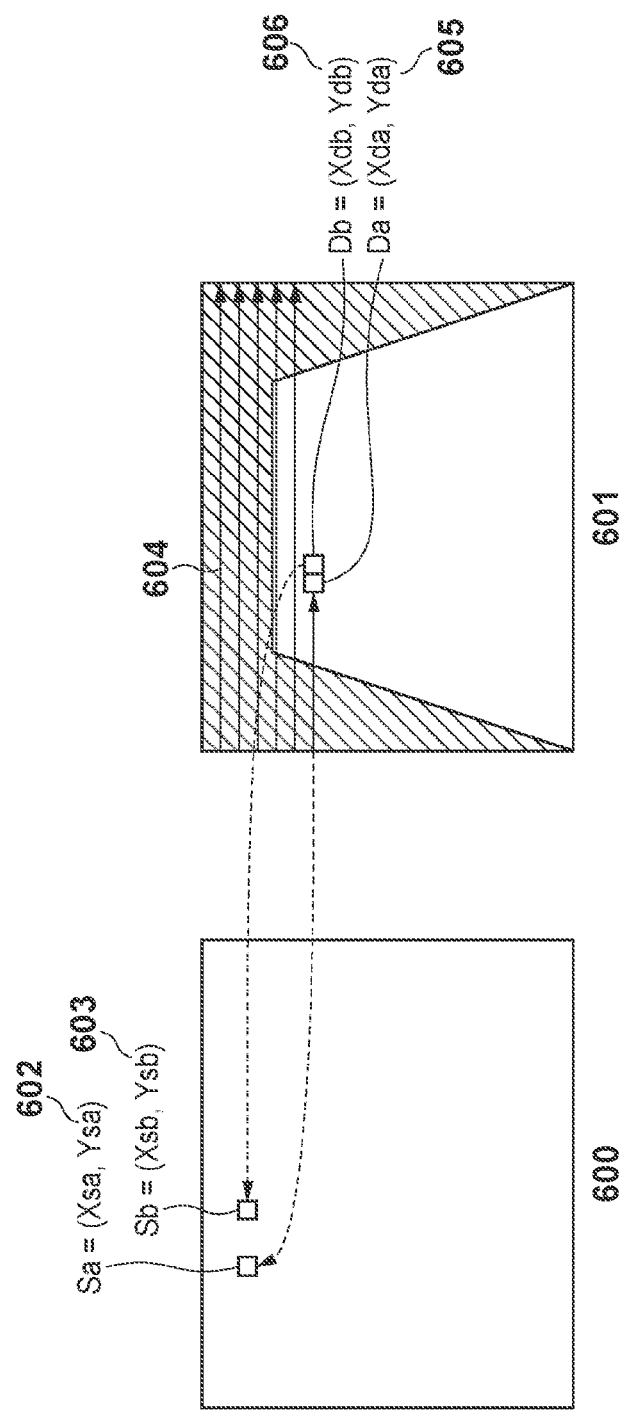
FIG. 6 is a view for illustrating processing performed by an area determination unit 505.

The counter 506 sequentially outputs the coordinate values of each pixel in a distortion-corrected image 601 (in a transformed image). For example, the counter 506 scans each pixel in the distortion-corrected image 601, and outputs the coordinate position of each scanned pixel as an output pixel position 544. Processing performed by the counter 506 will be described with reference to FIG. 6. Referring to FIG. 6, an input image 600 indicates the effective area of image data input to the distortion correction unit 500. Also, the distortion-corrected image 601 indicates image data output from the distortion correction unit 500. A non-hatched portion of the distortion-corrected image 601 is the effective area. More specifically, the non-hatched portion corresponds to the input image 600. The counter 506 outputs the pixel position of each pixel on a scanning line 604 in the distortion-corrected image 601, such as an output pixel position 605 indicating a pixel Da, as the output pixel position 544.

Processing performed by the counter 506 will be described herein with reference to a flowchart shown in FIG. 9. The following description assumes that in the distortion-corrected image 601 including XPixelNum pixels in the X-direction and YPixelNum pixels in the Y-direction, each pixel has coordinate values from (1, 1) to (XPixelNum, YPixelNum). Nevertheless, a method of setting coordinate values can be arbitrarily selected by those skilled in the art, and it should be easy for those skilled in the art to correct the flowing processing in accordance with the selected method of setting coordinate values.

In step S901, the counter 506 acquires the image size information 540. A distortion-corrected image 601 having the size indicated by the image size information 540 will be output from the distortion correction unit 500. Also, the counter 506 sets both the X- and Y-coordinates to zero. In step S902, the counter 506 determines the next Y-coordinate. For example, the counter 506 need only increment Y by one. In step S903, the counter 506 determines the next X-coordinate. For example, the counter 506 need only increment X by one.

In step S904, the counter 506 outputs a set of the X- and Y-coordinates as the output pixel position 544. In step S905, the counter 506 determines whether the output pixel position 544 is positioned at the terminal end of the scanning line. For example, if X is equal to XPixelNum, the counter 506 can determine that the output pixel position 544 is positioned at the terminal end of the scanning line. If X is not equal to XPixelNum (or X is smaller than XPixelNum), the process returns to step S903. If X is equal to XPixelNum (or X is equal to or larger than XPixelNum), the process advances to step S906.

In step S906, the counter 506 determines whether the output pixel position 544 is positioned at the terminal end of the distortion-corrected image 601. For example, if Y is equal to YPixelNum, the counter 506 can determine that the output pixel position 544 is positioned at the terminal end of the distortion-corrected image 601. If Y is not equal to YPixelNum (or Y is smaller than YPixelNum), the counter 506 sets X to zero, and the process returns to step S902. If Y is equal to YPixelNum (or if Y is equal to or larger than YPixelNum), the process advances to step S907.

In step S907, the counter 506 determines whether the output processing of an output pixel position is to end. This determination may be performed in accordance with, for example, a user instruction or whether an input image to be converted into a distortion-corrected image remains. If the output processing of an output pixel position is not to end, the counter 506 sets both X and Y to zero, and the process returns to step S901. If the image input processing is to end, the process shown in FIG. 9 ends.

The area determination unit 505 acquires an input pixel position 558 corresponding to each output pixel position 544. The area determination unit 505 also acquires an input pixel position 559 corresponding to the position of a pixel adjacent to that indicated by the output pixel position 544. A coordinate conversion unit (not shown) provided in the area determination unit 505 can perform these types of processing. Further, the area determination unit 505 selects a filter to be applied to the output pixel position 544, in accordance with the input pixel positions 558 and 559. More specifically, the area determination unit 505 outputs filter selection information 548 for specifying a filter. The filter selection information 548 is used when the filter unit 501 performs filter processing. A coefficient selection unit (not shown) provided in the area determination unit 505 can perform these types of processing.

The relationships among the output pixel position 544 and the input pixel positions 558 and 559 will be described herein with reference to FIG. 6. The output pixel position 544 corresponds to the output pixel position 605 shown in FIG. 6. The pixel positioned at the output pixel position 605 is defined as Da. Also, the input pixel position 558 corresponds to an input pixel position 602 shown in FIG. 6. A pixel positioned at the input pixel position 602 is defined as Sa.

When the input image 600 is corrected to the distortion-corrected image 601, the pixel Sa moves to the pixel Da. The relationship between the output pixel position and the input pixel position is defined in the coordinate conversion table 515. That is, the relationship between the output pixel position 605 (the position of the pixel Da) and the input pixel position 602 (the position of the pixel Sa) is defined in the coordinate conversion table 515. In other words, the coordinate conversion table 515 defines the pixel position in the input image 600 to be mapped to the pixel of interest position in the distortion-corrected image 601. Therefore, the area determination unit 505 can obtain the input pixel position 558 (input pixel position 602) from the output pixel position 544 (output pixel position 605).

Also, an output pixel position 606 is the pixel position of a pixel adjacent to the pixel Da. The pixel positioned at the output pixel position 606 is defined as Db. In this embodiment, the output pixel position 606 (adjacent pixel position) is a coordinate position obtained by incrementing the X-coordinate of the output pixel position 605 by one. That is, the pixel Db is a pixel adjacent to the pixel Da in the positive X-direction. Letting (Xda, Yda) be the coordinate position of the pixel Da, and (Xdb, Ydb) be the coordinate position of the pixel Db, Xdb=Xda+1, and Ydb=Yda.

The input pixel position 559 corresponds to an input pixel position 603 shown in FIG. 6. A pixel corresponding to the input pixel position 603 is defined as Sb. When the input image 600 is corrected to the distortion-corrected image 601, the pixel Sb moves to the pixel Db. That is, the area determination unit 505 can obtain the input pixel position 559 (input pixel position 603) from the output pixel position 544 (output pixel position 605) by looking up the coordinate conversion table 515.

Figure 10:
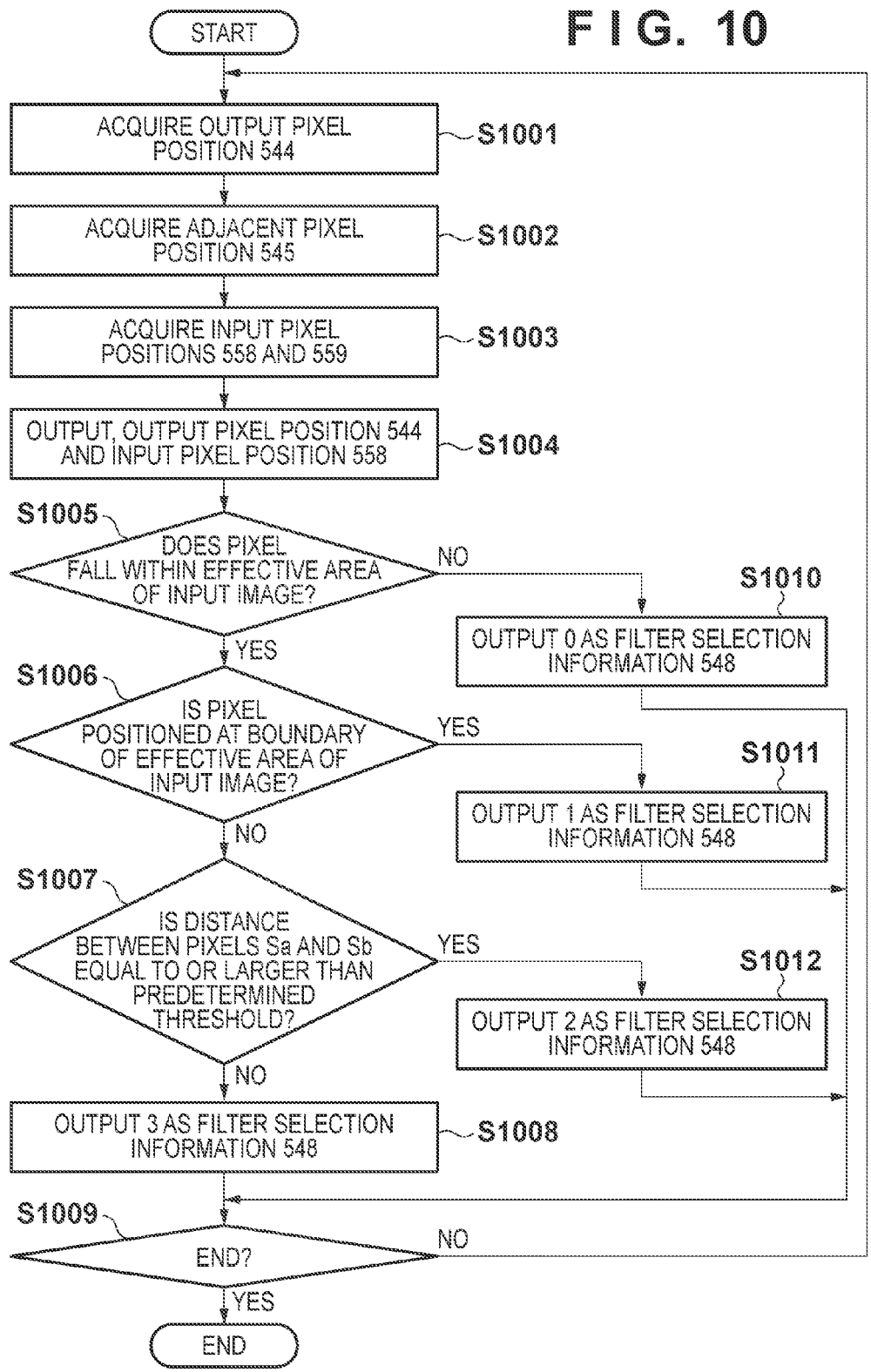
FIG. 10 is a flowchart illustrating an example of processing performed by the area determination unit 505.

Processing performed by the area determination unit 505 will be described in detail next with reference to a flowchart shown in FIG. 10. In step S1001, the area determination unit 505 acquires an output pixel position 544 from the counter 506. In step S1002, the area determination unit 505 calculates a pixel position 545 of a pixel adjacent to that at the output pixel position 544, as described above. In step S1003, the area determination unit 505 acquires an input pixel position 558 corresponding to the output pixel position 544 and an input pixel position 559 corresponding to the pixel position 545 by looking up the coordinate conversion table 515, as described above. In step S1004, the area determination unit 505 outputs a set of the output pixel position 544 and the input pixel position 558 to the input image acquisition unit 504.

In step S1005, the area determination unit 505 determines whether the pixel indicated by the input pixel position 558 falls within the effective area of the input image (determination unit). The effective area of the input image is indicated by the image size information 540. In this embodiment, in the distortion-corrected image 601 including XPixelNum pixels in the X-direction and YPixelNum pixels in the Y-direction, each pixel has coordinate values from (1, 1) to (XPixelNum, YPixelNum), as described above. Also, let (Xsa, Ysa) be the coordinate position of the pixel Sa indicated by the input pixel position 558. In this case, if Xsa is smaller than one or larger than XPixelNum, it can be determined that the pixel indicated by the input pixel position 558 falls outside the effective area of the input image. Also, if Ysa is smaller than one or larger than YPixelNum, it can be determined that the pixel indicated by the input pixel position 558 falls outside the effective area of the input image.

If the pixel indicated by the input pixel position 558 falls outside the effective area of the input image, the process advances to step S1010. In step S1010, the area determination unit 505 outputs 0 as the filter selection information 548 for the output pixel position 544, and the process advances to step S1009. On the other hand, if the pixel indicated by the input pixel position 558 falls within the effective area of the input image, the process advances to step S1006.

In step S1006, the area determination unit 505 determines whether the pixel indicated by the input pixel position 558 is positioned at the boundary of the effective area of the input image. More specifically, if Xsa is one or equal to XPixelNum, it can be determined that the pixel indicated by the input pixel position 558 is positioned at the boundary of the effective area of the input image. Also, if Ysa is one or equal to YPixelNum, it can be determined that the pixel indicated by the input pixel position 558 is positioned at the boundary of the effective area of the input image. If the pixel indicated by the input pixel position 558 is positioned at the boundary of the effective area of the input image, the process advances to step S1011. In step S1011, the area determination unit 505 outputs 1 as the filter selection information 548 for the output pixel position 544, and the process advances to step S1009. If the pixel indicated by the input pixel position 558 is not positioned at the boundary of the effective area of the input image, the process advances to step S1007.

In steps S1007, S1008, and S1012, the area determination unit 505 determines the filter selection information 548 in accordance with the input pixel positions 558 and 559. The area determination unit 505 can determine the filter selection information 548 in accordance with, for example, the distance between the pixel Sa at the input pixel position 558 and the pixel Sb at the input pixel position 559.

In this embodiment, in step S1007, the area determination unit 505 calculates the distance between the pixels Sa and Sb in accordance with the input pixel positions 558 and 559. Letting (Xsb, Ysb) be the coordinate position of the pixel Sb, the distance between the pixels Sa and Sb is $\sqrt{((Xsa-Xsb)^2+}$ (Ysa−Ysb)$^2$). The area determination unit 505 determines whether the calculated distance is equal to or larger than a predetermined threshold. If the calculated distance is equal to or larger than the predetermined threshold, the process advances to step S1012. If the calculated distance is smaller than the predetermined threshold, the process advances to step S1008.

In step S1012, the area determination unit 505 outputs 2 as the filter selection information 548 for the output pixel position 544, and the process advances to step S1009. In step S1008, the area determination unit 505 outputs 3 as the filter selection information 548 for the output pixel position 544, and the process advances to step S1009.

In step S1009, the area determination unit 505 determines whether the output processing of an input pixel position and the output processing of filter selection information are to end. If, for example, the next output pixel position 544 is input from the counter 506, the area determination unit 505 can determine that these types of output processing are not to end. If these types of output processing are not to end, the process returns to step S1001. If these types of output processing are to end, the process shown in FIG. 10 ends.

The filter selection information 548 output from the area determination unit 505 is used when the filter unit 501 performs filter processing, as described above. More specifically, the filter unit 501 selects a filter in accordance with the filter selection information 548. The relationship between the filter selection information 548 and the filter selected by the filter unit 501 will be described herein with reference to examples of filters shown in FIGS. 8A to 8D. In this embodiment, the filter selection information 548 has a value of 0, 1, 2, or 3, as described above. FIGS. 8A to 8D show filters corresponding to the respective values. That is, a filter 800 is used if the filter selection information 548 is 0. A filter 801 is used if the filter selection information 548 is 1. A filter 802 is used if the filter selection information 548 is 2. A filter 803 is used if the filter selection information 548 is 3. Referring to FIGS. 8A to 8D, coefficients indicated by hatched portions correspond to the centers of the filters.

A filter processing unit 512 can perform spatial filter processing for the pixel of interest in the image using the filter 800. The filter processing unit 512 can obtain, for example, a weighted average by the spatial filter processing. That is, the filter processing unit 512 can calculate the pixel values at an output pixel position 554 in an output image by a convolution operation between filter coefficients and the pixel values of pixels near the output pixel position 554 (near the processing pixel position) in a distortion-corrected image.

The coefficients of the filter 800 are all 0. Therefore, if spatial filter processing is performed for the pixel of interest in the image using the filter 800, the output value is 0. Nevertheless, to prevent any smearing between the blanking area and the effective area, the filter coefficient at the center of the filter 800 may be 1. In this case, when filter processing is performed for the pixel of interest using the filter 800, the pixel values and output value of the pixel of interest match each other. That is, if the filter 800 is used, the pixel values of the pixel at the processing pixel position in a distortion-corrected image or predetermined pixel values are set as those of the pixel at the processing pixel position in an output image.

On the other hand, in the filter 801, the coefficient at the center of this filter is 1, and the remaining coefficients are 0. Therefore, if filter processing is performed for the pixel of interest using the filter 801, the pixel values and output value of the pixel of interest match each other. If filter processing is performed for the pixel of interest using the filter 802, an output value is calculated in consideration of the pixel values of pixels adjacent to the pixel of interest. If filter processing is performed for the pixel of interest using the filter 803, an output value is calculated in consideration of the pixel values of pixels in a range wider than that when the filter 802 is used. That is, the reference area in the filter processing becomes wider in the order of the filters 801, 802, and 803.

When the input image 600 is corrected to the distortion-corrected image 601, the reduction ratio in the vicinity of the pixel Da can be approximated by (Distance between Pixels Sa and Sb)/(Distance between Pixels Da and Db). In this embodiment, the distance between the pixels Da and Db in the distortion-corrected image 601 stays constant (one pixel). Therefore, the distance between the pixels Sa and Sb has a correlation value with the reduction ratio. In this embodiment, if the distance between the pixels Sa and Sb is equal to or larger than a predetermined threshold, the filter 802 is selected. In other words, as the reduction ratio at the output pixel position 605 (pixel Da) in the distortion-corrected image 601 increases, a filter which has pixels in a narrower range as a reference is selected.

Figure 12:
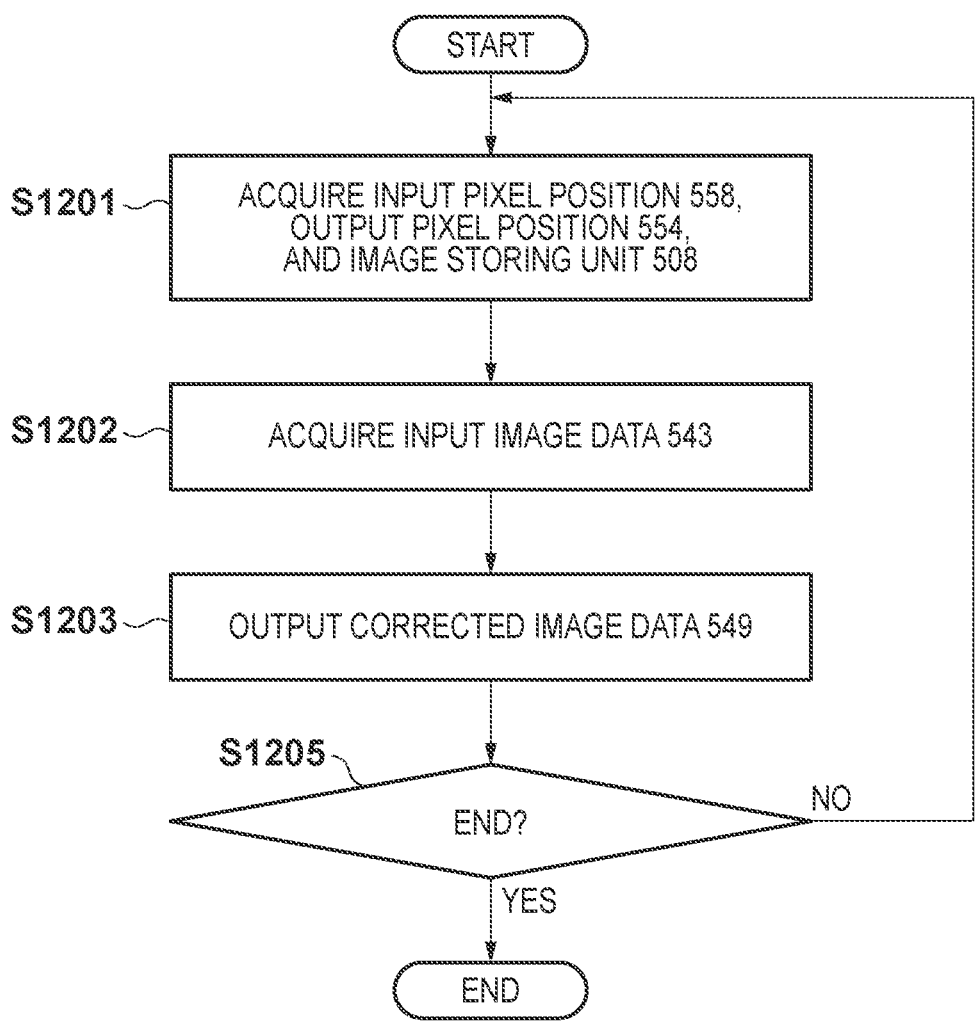
FIG. 12 is a flowchart illustrating an example of processing performed by an input image acquisition unit 504.

The input image acquisition unit 504 will be described in detail next. The input image acquisition unit 504 generates a distortion-corrected image. Processing performed by the input image acquisition unit 504 will be described with reference to a flowchart shown in FIG. 12. In step S1201, the input image acquisition unit 504 acquires an input pixel position 558, output pixel position 544, and filter selection information 548 from the area determination unit 505.

In step S1202, the input image acquisition unit 504 acquires input image data 543 corresponding to the input pixel position 558 from the frame memory 503 (transformation unit). At this time, the input image acquisition unit 504 can calculate the address, at which the input image data 543 corresponding to the input pixel position 558 is stored, in reference to the image size information 540. However, input image data 543 corresponding to the input pixel position 558 is sometimes absent. This occurs when, for example, the input pixel position 558 falls outside the input image area. In this case, that is, if it is determined that an input pixel position 558 to be mapped to the output pixel position 544 is absent, the input image acquisition unit 504 determines input image data indicating predetermined pixel values (predetermined values) as input image data corresponding to the input pixel position 558. These predetermined pixel values normally represent a black pixel (R, G, B=0, 0, 0). However, these predetermined pixel values can be arbitrary pixel values.

In step S1203, the input image acquisition unit 504 outputs to the buffer 507 the input image data 543 acquired in step S1202, the output pixel position 544 acquired in step S1201, and the filter selection information 548 acquired in step S1201. A distortion-corrected image is represented by a set of the output pixel position 544 and the input image data 543.

In step S1205, the input image acquisition unit 504 determines whether the output processing is to end. If, for example, the next output pixel position 544 is input from the area determination unit 505, the input image acquisition unit 504 can determine that the output processing is not to end. If the output processing is not to end, the process returns to step S1201. If the output processing is to end, the process shown in FIG. 12 ends.

A set of the output pixel position 544, the input image data 543, and the filter selection information 548 is output to the buffer 507, as described above. These pieces of information are temporarily stored in the buffer 507, and output from the distortion correction unit 500. The input image data 543 which is stored in the buffer 507 and output from the distortion correction unit 500 in this way will be referred to as corrected image data 549 hereinafter. In this embodiment, the output pixel position 544 is stored in the buffer 507. However, normally, output pixel positions 544 are sequentially selected in the raster order, and the output pixel position 544 corresponding to each input image data 543 can be detected without using the output pixel positions 544 in this case. Also, in outputting the corrected image data 549, the input image acquisition unit 504 may rewrite the Vsync and Hsync flags in accordance with the position of the pixel indicated by the corrected image data 549 in the distortion-corrected image. Hence, the output pixel position 544 need not always be stored in the buffer 507.

The filter unit 501 will be described in detail next. The filter unit 501 performs filter processing for a distortion-corrected image input from the distortion correction unit 500. More specifically, the filter unit 501 generates output image data 553 using the corrected image data 549 and filter selection information 548. The filter unit 501 includes an image storing unit 508, reference pixel acquisition unit 510, counter 511, and filter processing unit 512 as processing units. The filter unit 501 also includes a frame memory 509, buffer 514, and filter holding table 513 as storage units. The frame memory 509 and buffer 514 can be similar to the frame memory 503 and buffer 507, respectively, provided in the distortion correction unit 500. Also, the filter holding table 513 can be implemented by a ROM 401 (to be described later).

Each unit provided in the filter unit 501 will be described below. The image storing unit 508 executes the same operation as the image storing unit 502, but acquires not only corrected image data 549 but also filter selection information 548 from the distortion correction unit 500. The image storing unit 508 stores the corrected image data 549 and filter selection information 548 in the frame memory 509. The image storing unit 508 can store the corrected image data 549 and filter selection information 548 in the frame memory 509 in the same way as the image storing unit 502. The counter 511 sequentially outputs, output pixel positions 554 in reference to the image size information 540, like the counter 506.

Figure 11:
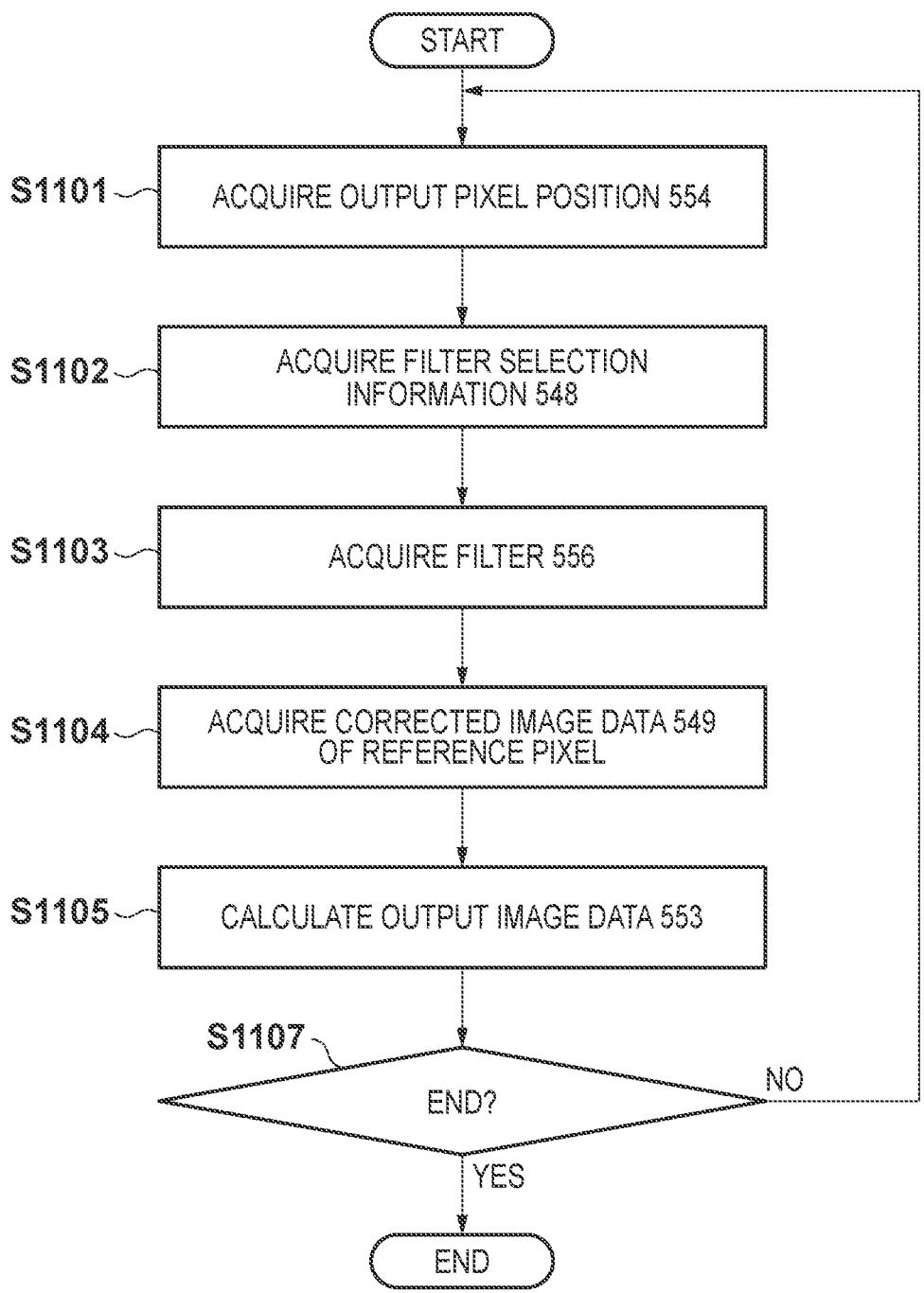
FIG. 11 is a flowchart illustrating an example of processing performed by a reference pixel acquisition unit 510.

The filter processing unit 512 calculates the pixel values at the output pixel position 554 input from the counter 511 (calculation unit). A detailed example of processing performed by the filter processing unit 512 will be described with reference to a flowchart shown in FIG. 11. In step S1101, the filter processing unit 512 acquires an output pixel position 554. In step S1102, the filter processing unit 512 acquires filter selection information 548 corresponding to the output pixel position 554 from the frame memory 509. More specifically, the filter processing unit 512 sends the output pixel position 554 to the reference pixel acquisition unit 510. The reference pixel acquisition unit 510 acquires the filter selection information 548 for the sent pixel position from the frame memory 509, and sends it back to the filter processing unit 512.

In step S1103, the filter processing unit 512 acquires from the filter holding table 513 a filter 556 corresponding to the filter selection information 548 acquired in step S1102. More specifically, the filter processing unit 512 acquires from the filter holding table 513 each filter coefficient and the relative position of the pixel to be calculated using this filter coefficient. The filter holding table 513 holds the filter selection information 548 and filter 556 in association with each other. The relationship between the filter selection information 548 and the selected filter 556 is as described earlier.

In step S1104, the filter processing unit 512 acquires corrected image data 549 for a pixel (to be referred to as a reference pixel hereinafter) used to calculate the pixel values at the output pixel position 554. The reference pixel is specified by the filter 556 acquired in step S1103. That is, the filter processing unit 512 acquires corrected image data 549 for the pixel to be calculated using each filter coefficient. More specifically, the filter processing unit 512 sends a reference pixel position 555 to the reference pixel acquisition unit 510 for each reference pixel. The reference pixel acquisition unit 510 acquires the corrected image data 549 for the sent pixel position from the frame memory 509, and sends it back to the filter processing unit 512. The reference pixel acquisition unit 510 calculates the address in the frame memory 509, at which the corrected image data 549 for the sent pixel position is stored, in reference to the pixel position and image size information 540. Upon this operation, the reference pixel acquisition unit 510 can acquire from the frame memory 509 corrected image data 549 for pixel positions near the output pixel position 554. Nevertheless, the filter processing unit 512 may acquire from the frame memory 509 corrected image data 549 and filter selection information 548 for pixel positions near the output pixel position 554 in step S1102.

In step S1105, the filter processing unit 512 calculates the pixel values at the output pixel position 554 using the filter 556 acquired in step S1103, and the corrected image data 549 acquired in step S1104 for the reference pixel. For example, the filter processing unit 512 can generate output image data 553 by applying spatial filter processing based on the filter 556 to the reference pixel. As an example of the spatial filter processing, weighted average processing based on the filter 556 can be used. The filter processing unit 512 temporarily stores the thus obtained output image data 553 in the buffer 514. The output image data 553 stored in the buffer 514 is output from the filter unit 501.

In step S1107, the filter processing unit 512 determines whether the filter processing is to end. If, for example, the next output pixel position 554 is input from the counter 511, the filter processing unit 512 can determine that the filter processing is not to end. If the filter processing is not to end, the process returns to step S1101. If the filter processing is to end, the process shown in FIG. 11 ends.

Figure 14:
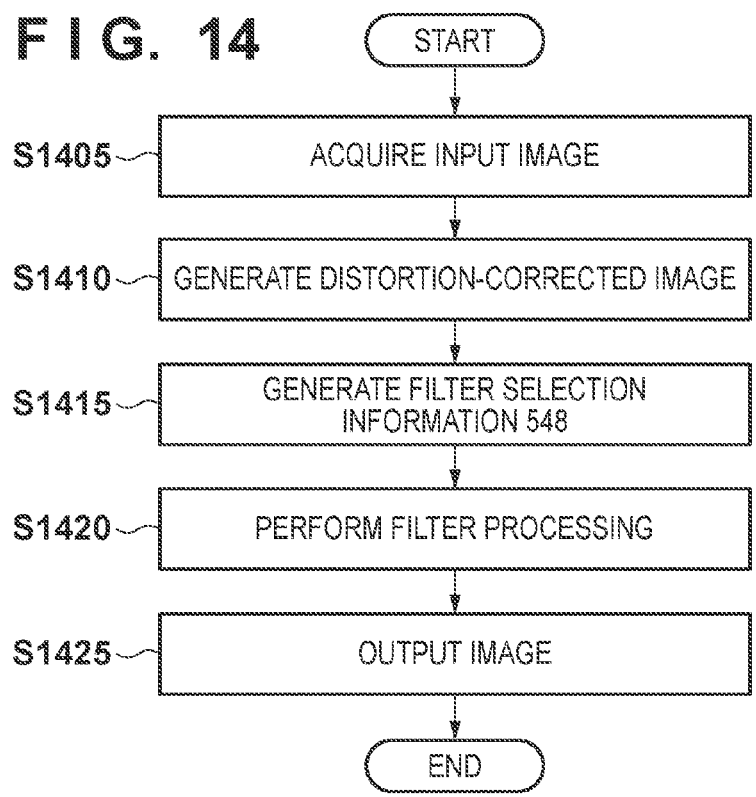
FIG. 14 is a flowchart illustrating an example of processing performed by the image processing apparatus according to the first embodiment.

The operation of each unit provided in the image processing apparatus according to this embodiment has been described above. The sequence of an operation performed by the image processing apparatus according to this embodiment will be described next with reference to a flowchart shown in FIG. 14. In step S1405, the image storing unit 502 acquires an input image represented by a plurality of input image data 542. This processing can be performed in accordance with the flowchart shown in FIG. 13.

In step S1410, the input image acquisition unit 504 acquires input image data 542 corresponding to each pixel which forms a distortion-corrected image, using the counter 506 and coordinate conversion table 515. The input image acquisition unit 504 thus generates a distortion-corrected image, which includes a transformed input image. This processing can be performed in accordance with the flowcharts shown in FIGS. 9 and 12.

In step S1415, the area determination unit 505 generates filter selection information 548 for specifying a filter to be applied to each pixel which forms the distortion-corrected image. This processing can be performed in accordance with the flowchart shown in FIG. 10.

In step S1420, the filter processing unit 512 performs filter processing for each pixel which forms the distortion-corrected image, using the filter specified by the filter selection information 548. The filter processing unit 512 thus performs filter processing for the distortion-corrected image to generate an output image. This processing can be performed in accordance with the flowchart shown in FIG. 11. In step S1425, the filter processing unit 512 outputs the generated output image.

The physical configuration of the image processing apparatus according to this embodiment will be described lastly. The image processing apparatus according to this embodiment can be implemented as software, hardware, or a combination of software and hardware. The image processing apparatus according to this embodiment can be implemented as, for example, a combination of hardware which implements at least one function of each unit shown in FIG. 5.

Figure 1A:
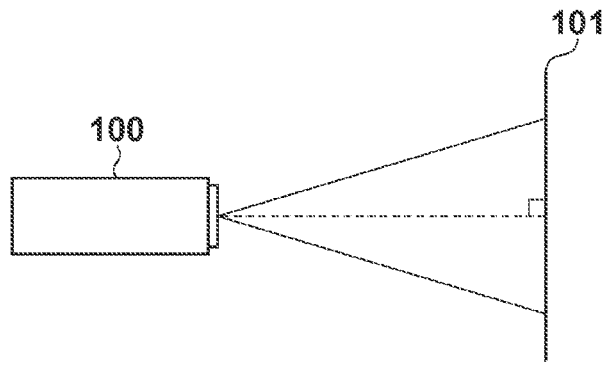
FIGS. 1A to 1D are views illustrating examples in which images are displayed on a screen 101 using a projector 100.
Figure 1B:
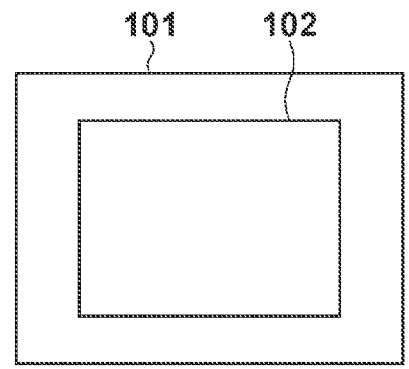
Figure 1C:
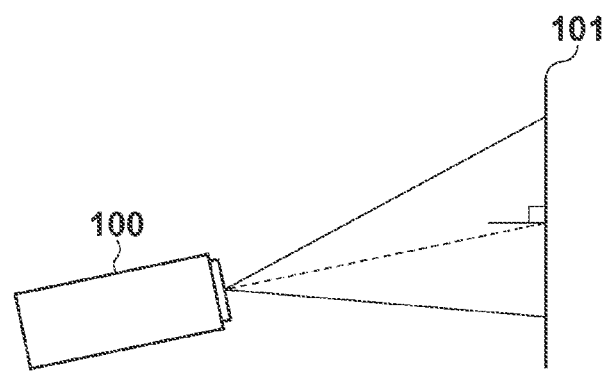
Figure 1D:
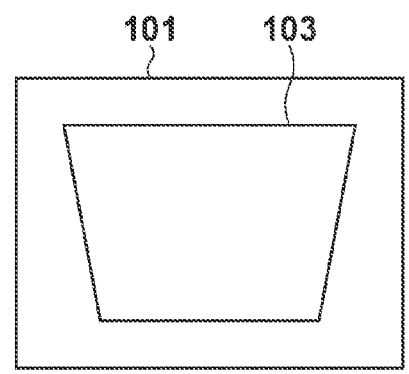
Figure 3A:
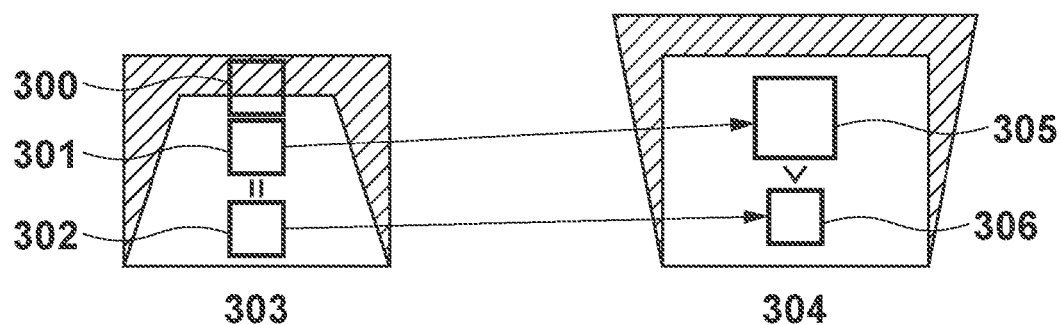
FIGS. 3A and 3B are views for illustrating problems posed when distortion correction processing and filter processing are used in combination.
Figure 3B:
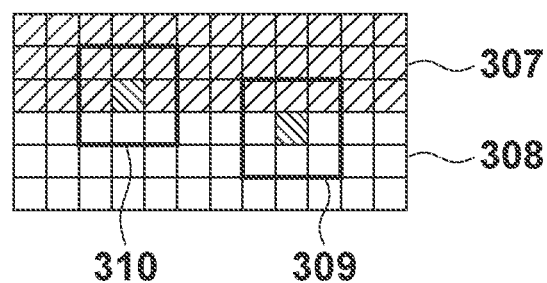
Figure 4:
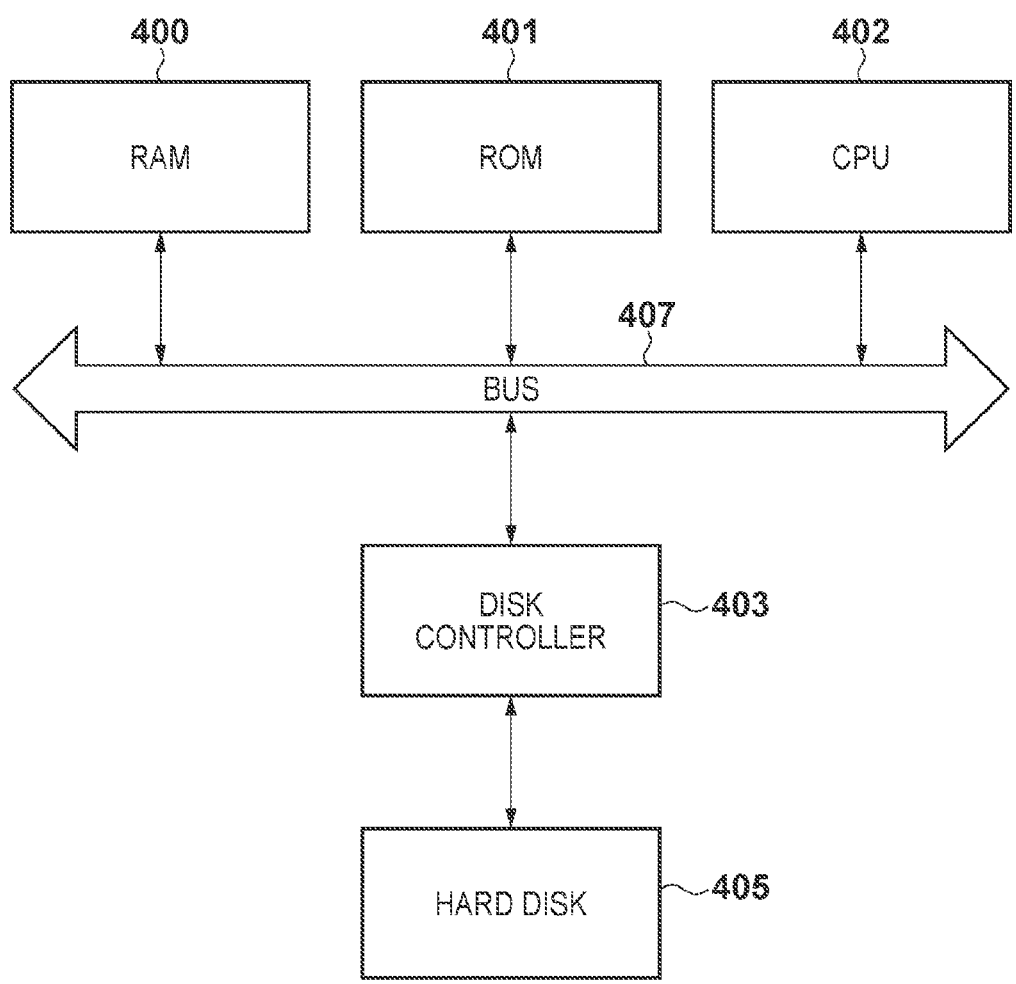
FIG. 4 is a block diagram illustrating an example of the physical configuration of a computer according to the first embodiment.

The image processing apparatus according to this embodiment can also be implemented by a computer such as a personal computer. FIG. 4 illustrates an example of the physical configuration of a computer which implements the image processing apparatus according to this embodiment. To execute the function of the image processing apparatus according to this embodiment by the computer, each functional configuration need only be represented by a program and loaded into this computer. Upon this operation, the computer can implement all functions according to this embodiment. In this case, each of the constituent components shown in the drawings including FIG. 5 can be implemented by a mathematical function or a subroutine executed by a CPU.

Also, a computer program is normally stored in a computer-readable storage medium such as a CD-ROM. The computer program can be executed by setting the storage medium in a reading device (for example, a CD-ROM drive) provided in the computer, and copying or installing the computer program into a system. Therefore, it is obvious that the computer-readable storage medium also falls within the scope of the present invention.

Referring to FIG. 4, a CPU 402 controls the operation of the overall computer. The CPU 402 executes, for example, a program stored in the RAM 400. The RAM 400 loads, for example, a program stored on a storage medium such as a hard disk 405, and stores it. In the computer, the hard disk 405 stores a program which implements the processing procedure of each unit shown in FIG. 5. In program execution, the program is loaded into the RAM 400 and executed by the CPU 402. The RAM 400, the ROM 401, the CPU 402, and a disk controller 403 are communicably connected to each other via a bus 407. Also, the hard disk 405 can be accessed via the disk controller 403. Devices which are used to input information to the computer, such as a mouse and a keyboard, can also be connected to the bus 407. Devices used by the computer to output information, such as a monitor and a printer, can moreover be connected to the bus 407.

Especially the image storing unit 502, the counter 506, the area determination unit 505, the input image acquisition unit 504, the image storing unit 508, the counter 511, the reference pixel acquisition unit 510, and the filter processing unit 512 can be implemented as software executed by the CPU 402. Also, the frame memory 503, the buffer 507, the frame memory 509, and the buffer 514 can be implemented by the RAM 400. Moreover, the coordinate conversion table 515 and the filter holding table 513 can be implemented by the ROM 401.

[Second Embodiment]

In the first embodiment, the filter unit 501 performs filter processing for a distortion-corrected image to generate an output image, and outputs this output image. An image processing apparatus according to the second embodiment transforms a moving image to further improve the frame rate of the moving image. That is, the image processing apparatus according to the second embodiment generates a plurality of frame images from each frame image. To increase the frame rate of the moving image, a technique of performing filter processing for a frame image to improve the image quality is known. The image processing apparatus according to the second embodiment also performs filter processing to generate a plurality of frame images from one frame image.

In this embodiment, a moving image formed by continuous frame images is input to a distortion correction unit 500. The distortion correction unit 500 performs transformation processing for each frame image to generate a moving image formed by continuous distortion-corrected images. A filter unit 501 performs filter processing for each distortion-corrected image to generate a plurality of output images. The filter unit 501 outputs a moving image formed by the respective output images. That is, the frame rate of a moving image output from the filter unit 501 is higher than that of a moving image input to the filter unit 501. A configuration in which the filter unit 501 performs frame rate improvement processing and then the distortion correction unit 500 performs transformation processing is also available. However, in this case, the number of images to be processed by the distortion correction unit 500 increases, and the processing load, in turn, increases. Therefore, it is advantageous to perform transformation processing by the distortion correction unit 500 and then perform frame rate improvement processing by the filter unit 501.

The detailed configuration of the image processing apparatus according to this embodiment will be described below. The image processing apparatus according to this embodiment has the same configuration as that according to the first embodiment shown in FIG. 5. To implement the configuration according to this embodiment, a counter 511 need only repeat the processes in steps S901 to S906. More specifically, when the frame rate is increased to N times, the counter 511 need only execute the processes in steps S901 to S906 N times every time one distortion-corrected image is input to the filter unit 501.

The image processing apparatus according to this embodiment generates N output images (sub-frame images) from one distortion-corrected image. Note that different filters may be used to generate the respective sub-frame images. More specifically, the image processing apparatus may perform a filter calculation using a low-frequency enhancing filter to generate a first sub-frame image, and perform a filter calculation using a high-frequency enhancing filter to generate a second sub-frame image. The image processing apparatus according to this embodiment may include a plurality of filter holding tables 513. That is, the image processing apparatus may look up different filter holding tables 513 to generate the respective sub-frame images.

Other Embodiments

In the above-mentioned embodiments, one of the filters 800, 801, 802, and 803 is selected. However, the method of selecting a filter is not limited to the above-mentioned method. For example, in the above-mentioned embodiments, the filter 802 or 803 is selected in accordance with the distance between the input pixel position 558 (pixel Sa) and the input pixel position 559 (pixel Sb). However, one of three or more filters may be selected by comparing the distance between the input pixel position 558 (pixel Sa) and the input pixel position 559 (pixel Sb) with a plurality of thresholds.

The image quality can also be improved using a configuration in which the filter 800 is selected if the input pixel position 558 falls outside the input image, and the filter 802 is selected if the input pixel position 558 falls within the input image. That is, in transformation processing in which the transformed image has the blanking area, spatial filter processing can be appropriately performed at the boundary portion between the blanking area and the effective area. Hence, it is not indispensable to select a filter based on the distance between the input pixel position 558 (pixel Sa) and the input pixel position 559 (pixel Sb).

On the other hand, the image quality can also be improved simply by selecting a filter in accordance with whether the input pixel position 558 is positioned at the boundary of the input image area or whether the input pixel position 558 is positioned near the boundary of the input image area, instead of determining whether the input pixel position 558 falls outside the input image area. That is, as the input pixel position 558 is positioned closer to the boundary portion of the input image area, a filter which has pixels in a narrower range as a reference need only be used.

Again, the image quality can also be improved simply by selecting a filter based on the distance between the input pixel position 558 (pixel Sa) and the input pixel position 559 (pixel Sb), instead of determining whether the input pixel position 558 falls outside the input image area. That is, in transformation processing in which the enlargement/reduction ratio varies in each individual area, spatial filter processing which produces a uniform effect can be performed. Such a modification can be achieved by modifying steps S1005 to S1007.

In one embodiment, first filter coefficients can be selected if a pixel position to be mapped to the pixel of interest position in a distortion-corrected image is present in an input image, and the input pixel position 558 (pixel Sa) falls within a predetermined distance from one side of the input image. The first filter coefficients can be those of, for example, the filter 801. On the other hand, second filter coefficients can be selected if a pixel position to be mapped to the pixel of interest position in the distortion-corrected image is present in the input image, and the input pixel position 558 (pixel Sa) falls outside the predetermined distance from one side of the input image. The second filter coefficients can be those of, for example, the filter 803. Note that the number of coefficients included in the second filter coefficients is larger than the number of coefficients included in the first filter coefficients. That is, the number of pixels included in second pixels to be referred to in performing filter processing using the second filter coefficients is larger than the number of pixels included in first pixels to be referred to in performing filter processing using the first filter coefficients.

In other embodiments, first filter coefficients can be selected if a pixel position to be mapped to the pixel of interest position in a distortion-corrected image is present in an input image, and the distance between the input pixel position 558 (pixel Sa) and the input pixel position 559 (pixel Sb) is equal to or larger than a threshold. The first filter coefficients can be those of, for example, the filter 802. On the other hand, second filter coefficients can be selected if a pixel position to be mapped to the pixel of interest position in the distortion-corrected image is present in the input image, and the distance between the input pixel position 558 (pixel Sa) and the input pixel position 559 (pixel Sb) is smaller than the threshold. The second filter coefficients can be those of, for example, the filter 803. Note that the number of coefficients included in the second filter coefficients is larger than the number of coefficients included in the first filter coefficients. That is, the number of pixels included in second pixels to be referred to in performing filter processing using the second filter coefficients is larger than the number of pixels included in first pixels to be referred to in performing filter processing using the first filter coefficients.

In the above-mentioned embodiments, filter selection information 548 is determined based on the output pixel position 544, and a filter 556 corresponding to the filter selection information 548 is acquired by looking up the filter holding table 513. However, the filter holding table 513 may store a set of the output pixel position 544 and the filter 556. In this case, the filter processing unit 512 can acquire a filter 556 corresponding to the output pixel position 544 without using the filter selection information 548. Alternatively, a filter 556 may be calculated from the output pixel position 544 based on an arbitrary conversion equation, in place of the filter holding table 513.

A constituent component other than the area determination unit 505 may determine a filter 556 to be used in filter processing. The filter processing unit 512, for example, may determine a filter 556 to be used in filter processing, based on the input pixel position 558. Further, the filter processing unit 512 may calculate a filter 556 based on the input pixel position 558 (pixel Sa) and the input pixel position 559 (pixel Sb). For example, if the input pixel position 558 falls outside the input image area, the filter processing unit 512 uses the filter 800. On the other hand, if the input pixel position 558 falls within the input image area, the filter processing unit 512 calculates filter coefficients in accordance with a predetermined calculation equation using the input pixel position 558 (pixel Sa) and the input pixel position 559 (pixel Sb). More specifically, filter coefficients need only be calculated using a calculation equation which yields a larger coefficient at the center of the filter, and smaller coefficients on the peripheral portions of the filter as the distance between the input pixel position 558 (pixel Sa) and the input pixel position 559 (pixel Sb) reduces.

In the above-mentioned embodiments, the output pixel position 544 (pixel Da) is converted into the input pixel position 558 (pixel Sa) in accordance with the coordinate conversion table 515. Similarly, the pixel position 545 (pixel Db) is converted into the input pixel position 559 (pixel Sb) in accordance with the coordinate conversion table 515. However, these conversion operations may be performed in accordance with conversion equations. In this case, as in the above-mentioned embodiments, it can be determined whether the input pixel position 559 falls within the input image area. Also, the distance between the input pixel positions 558 and 559 can be calculated.

In the above-mentioned embodiments, the area determination unit 505 selects the pixel Da adjacent to the pixel Da in the positive X-direction as the pixel adjacent to the pixel Da. However, the pixel Db can be selected using an arbitrary method. The pixel Db even need not be adjacent to the pixel Da. That is, the area determination unit 505 may select, as the pixel Db, a pixel near the pixel Da, such as a pixel at a predetermined position relative to the pixel Da.

The area determination unit 505 may select a plurality of pixels near the pixel Da. The area determination unit 505 may select, for example, a pixel Db1 adjacent to the pixel Da in the positive X-direction, a pixel Db2 adjacent to the pixel Da in the negative X-direction, a pixel Db3 adjacent to the pixel Da in the positive Y-direction, and a pixel Db4 adjacent to the pixel Da in the negative Y-direction. In this case, the area determination unit 505 can determine filter selection information 548 in accordance with the distances between the pixel Sa in the input image corresponding to the pixel Da and pixels Sb1 to Sb4 in the input image corresponding to the pixels Db1 to Db4, respectively. The sum (or average) of the distance between the pixels Sa and Sb1, that between the pixels Sa and Sb2, that between the pixels Sa and Sb3, and that between the pixels Sa and Sb4, for example, may be obtained. The area determination unit 505 may determine filter selection information 548 by comparing the obtained sum with a predetermined threshold in the same way as in the above-mentioned embodiments.

In another embodiment, the area determination unit 505 may determine whether the pixel Sa is positioned near the boundary of the input image, in addition to or instead of determining whether the pixel Sa in the input image corresponding to the pixel Da is positioned at the boundary of the input image. For example, the area determination unit 505 may select a plurality of pixels Db near the pixel Da and determine whether the pixel Sb in the input image corresponding to each pixel Db falls within the input image area, as described above. If at least one pixel Sb does not fall within the input image area, the area determination unit 505 can determine that the pixel Da is present near the boundary of the effective area. In this case, the area determination unit 505 may determine filter selection information 548 so that a filter which has pixels in a relatively narrow range as a reference, such as the filter 801, is used for the pixel Da.

In still another embodiment, the area determination unit 505 may determine filter selection information 548 in accordance with the position of the pixel Sa (that is, the input pixel position 558) in the input image corresponding to the pixel Da and the boundary of the input image. The area determination unit 505 may determine filter selection information 548 so that, for example, the filter 556 used has a reference range narrower than the area of a circle having the distance between the pixel Sa and the boundary of the input image as a radius.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-106619, filed May 11, 2011, which is hereby incorporated by reference herein in its entirety.

What is claimed is:

1. An image processing apparatus for performing transformation processing for an input image, and performing filter processing for a transformed image including the transformed input image in an image area, thereby generating an output image, comprising:

an acquisition unit configured to acquire the input image;
a determination unit configured to determine whether a pixel position to be mapped to a pixel of interest position in the transformed image by the transformation processing is present among pixel positions in the input image;
a transformation unit configured to set a pixel value at the pixel position in the input image, to be mapped to the pixel of interest position in the transformed image, as a pixel value of a pixel at the pixel of interest position in the transformed image if the determination unit determines that the pixel position to be mapped is present, and set a predetermined value as the pixel value of the pixel at the pixel of interest position if the determination unit determines that the pixel position to be mapped is absent;

a calculation unit configured to calculate a pixel value of a pixel at a processing pixel position in the output image from the transformed image obtained by setting a pixel value for each pixel position which forms the transformed image by the transformation unit, wherein the calculation unit is further configured to:

set a pixel value, obtained by a convolution operation between filter coefficients and pixel values of pixels a predetermined distance from the processing pixel position in the transformed image, as the pixel value of the pixel at the processing pixel position in the output image if the determination unit determines that the pixel position to be mapped is present, and set one of a predetermined pixel value and the pixel value of the pixel at the processing pixel position in the transformed image as the pixel value of the pixel at the processing pixel position in the output image if the determination unit determines that the pixel position to be mapped is absent; and an output unit configured to output the output image obtained by setting a pixel value for each pixel position in the output image by the calculation unit.

2. The apparatus according to claim 1, wherein the determination unit is further configured to determine whether the pixel position, to be mapped to the processing pixel position in the transformed image, among the pixel positions in the input image falls within a predetermined distance from one side of the input image, and the calculation unit is further configured to:

set a pixel value, obtained by a convolution operation between first filter coefficients and pixel values of first pixels a predetermined distance from the processing pixel position in the transformed image, as the pixel value at the pixel of interest position in the output image if the determination unit determines that the pixel position to be mapped is present and falls within the predetermined distance from one side of the input image, and set a pixel value, obtained by a convolution operation between second filter coefficients and pixel values of second pixels which are larger in number than the first pixels and are spaced from the processing pixel position in the transformed image to a predetermined extent, as the pixel value of the pixel of interest position in the output image if the determination unit determines that the pixel position to be mapped is present and falls outside the predetermined distance from one side of the input image.

3. The apparatus according to claim 1, wherein the determination unit is further configured to determine whether the distance between a pixel position to be mapped to the processing pixel position in the transformed image by the transformation processing, and a pixel position to be mapped to an adjacent pixel position at a predetermined position relative to the processing pixel position in the transformed image by the transformation processing, among pixel positions in the input image, is not less than a threshold, and the calculation unit is further configured to:

set a pixel value, obtained by a convolution operation between first filter coefficients and pixel values of first pixels the predetermined distance from the processing pixel position in the transformed image, as the pixel value at the pixel of interest position in the output image if the determination unit determines that the pixel position to be mapped is present and the distance is not less than the threshold, and set a pixel value, obtained by a convolution operation between second filter coefficients and pixel values of second pixels which are larger in number than the first pixels and are spaced from the processing pixel position in the transformed image to the predetermined extent, as the pixel value of the pixel of interest position in the output image if the determination unit determines that the pixel position to be mapped is present and the distance is less than the threshold.

4. An image processing method of performing transformation processing for an input image, and performing filter processing for a transformed image including the transformed input image in an image area, thereby generating an output image, comprising the steps of:

acquiring the input image;

determining whether a pixel position to be mapped to a pixel of interest position in the transformed image by the transformation processing is present among pixel positions in the input image;

setting a pixel value at the pixel position in the input image, to be mapped to the pixel of interest position in the transformed image, as a pixel value of a pixel at the pixel of interest position in the transformed image if the pixel position to be mapped is determined to be present, and setting a predetermined value as the pixel value of the pixel at the pixel of interest position if the pixel position to be mapped is determined to be absent;

calculating a pixel value of a pixel at a processing pixel position in the output image from the transformed image obtained by setting a pixel value for each pixel position which forms the transformed image in the setting step, comprising:

setting a pixel value, obtained by a convolution operation between filter coefficients and pixel values of pixels a predetermined distance from the processing pixel position in the transformed image, as the pixel value of the pixel at the processing pixel position in the output image if the pixel position to be mapped is determined to be present, and setting one of a predetermined pixel value and the pixel value of the pixel at the processing pixel position in the transformed image as the pixel value of the pixel at the processing pixel position in the output image if the pixel position to be mapped is determined to be absent; and outputting the output image obtained by setting a pixel value for each pixel position in the output image in the calculation step.

5. A non-transitory storage medium storing a program for controlling a computer to function as each unit of an image processing apparatus of claim 1 when the program is executed by the computer.

* * * * *